United States Patent [19]

Tatemoto et al.

[11] Patent Number: 4,962,236
[45] Date of Patent: Oct. 9, 1990

[54] IODINE-CONTAINING COMPOUND, PREPARATION THEREOF AND BLOCK COPOLYMER COMPRISING THE SAME

[75] Inventors: Masayoshi Tatemoto; Yuji Yutani; Koji Fujiwara, all of Osaka, Japan

[73] Assignee: Daikin Industries Ltd., Osaka, Japan

[21] Appl. No.: 345,571

[22] Filed: May 1, 1989

Related U.S. Application Data

[62] Division of Ser. No. 136,916, Dec. 22, 1987, Pat. No. 4,861,836.

[30] Foreign Application Priority Data

Dec. 23, 1986 [JP] Japan .................. 61-310397
Dec. 23, 1986 [JP] Japan .................. 61-310398

[51] Int. Cl.$^5$ .................. C07C 43/16; C10M 105/54
[52] U.S. Cl. .................. 568/615; 252/54; 252/58; 568/684; 568/674
[58] Field of Search .................. 252/54, 58, 52 A; 568/615, 684

[56] References Cited

U.S. PATENT DOCUMENTS

| | | |
|---|---|---|
| 3,501,534 | 3/1970 | Anello et al. .................. 568/684 |
| 3,558,721 | 1/1971 | Yao .................. 568/684 |
| 4,594,458 | 6/1986 | Krespar .................. 568/615 |
| 4,724,092 | 2/1988 | Fukui et al. .................. 252/54 |
| 4,757,145 | 7/1988 | Caporiccio et al. .................. 568/615 |
| 4,836,944 | 6/1989 | Tohzaka .................. 252/54 |
| 4,845,268 | 7/1989 | Ohsaka et al. .................. 568/615 |

*Primary Examiner*—Jacqueline V. Howard
*Attorney, Agent, or Firm*—Birch, Stewart, Kolasch & Birch

[57] ABSTRACT

An iodine-containing compound consisting of at least two repeating units selected from the formulae:
—$(CH_2CF_2CF_2O)_a$—
—$(CHClCF_2CF_2O)_b$—
—$(CCl_2CF_2CF_2O)_c$—
—$(CHFCF_2CF_2O)_d$—
—$(CFClCF_2CF_2O)_e$—
—$(CF_2CF_2CF_2O)_f$— wherein a, b, c, d, e and f are each 0 or a positive integer and satisfy the following equations:
$2 \leq a+b+c+d+e+f \leq 200$ and
$1 \leq a+c+d+f$ and an iodine atom at at least one end of a molecule, which can provide a block copolymer which is useful as a grease.

6 Claims, 2 Drawing Sheets

IODINE-CONTAINING COMPOUND, PREPARATION THEREOF AND BLOCK COPOLYMER COMPRISING THE SAME

This application is a divisional of copending application Ser. No. 07/136,916 filed on Dec. 22, 1987, now U.S. Pat. No. 4,861,836.

BACKGROUND OF THE INVENTION

1. Field of the Invention

The present invention relates to a novel iodine-containing compound, a process for preparing the same and a block copolymer comprising the same. More particularly, it relates to a novel halogen-containing polyether compound which has an iodine atom at least at one end of a molecule, a process for preparing the same, and a fluorine-containing block copolymer comprising repeating units derived from said halogen-containing compound.

2. Description of the Prior Art

A linear polyether comprising repeating units of the formulae:

—$(CH_2CF_2CF_2O)_a$—

—$(CHClCF_2CF_2O)_b$—

—$(CCl_2CF_2CF_2O)_c$—

—$(CHFCF_2CF_2O)_d$—

—$(CFClCF_2CF_2O)_e$—

—$(CF_2CF_2CF_2O)_f$— wherein a, b, c, d, e and f are each 0 or a positive integer and satisfy the following equations:
$2 \leq a+b+c+d+e+f \leq 200$ and $1 \leq a+c+d+f$ (cf. Japanese Patent Kokai Publication Nos. 137928/1985, 202122/1985 and 113616/1986 and EP-A-No. 0148482).

However, none of the publications discloses a compound comprising the above described repeating units and having an iodine atom at least at one end of a molecule or a process for preparing it.

Japanese Patent Kokai Publication No. 3495/1978 or U.S. Pat. No. 4,158,678 discloses a fluorine-containing polysegmented polymer. However, any block copolymer comprising the above described repeating units has not been known.

SUMMARY OF THE INVENTION

One object of the present invention is to provide a novel iodine-containing compound.

Another object of the present invention is to provide a process for preparing said novel iodine-containing compound.

Further object of the present invention is to provide a novel block copolymer which is useful as a grease or an ingredient of a grease composition.

DETAILED DESCRIPTION OF THE INVENTION

Figure 1:
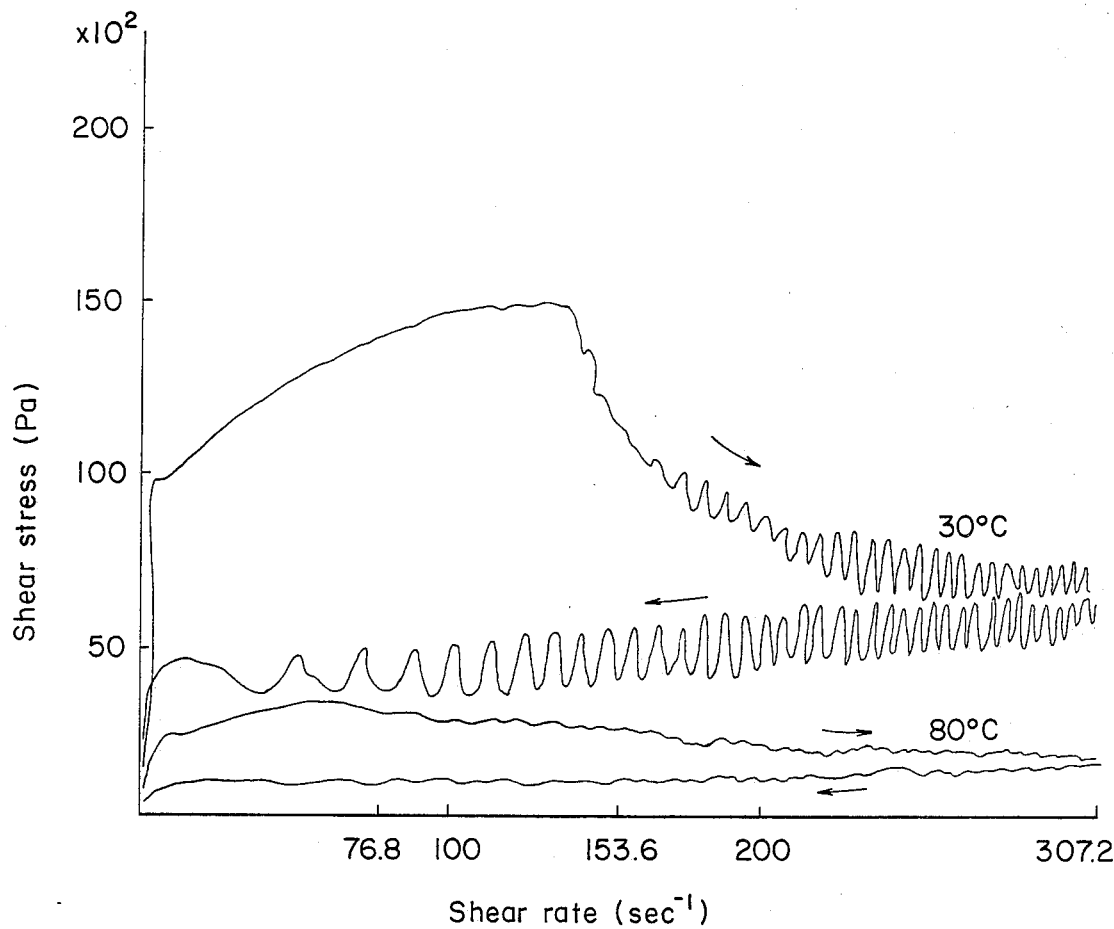
FIGS. 1 and 2 show shear stress-shear rate curves for the blocked grease and the non-blocked grease in Example 10, respectively.

According to one aspect of the present invention, there is provided a novel iodine-containing compound consisting of at least two repeating units selected from the formulae:

—$(CH_2CF_2CF_2O)_a$—

—$(CHClCF_2CF_2O)_b$—

—$(CCl_2CF_2CF_2O)_c$—

—$(CHFCF_2CF_2O)_d$—

—$(CFClCF_2CF_2O)_e$—

—$(CF_2CF_2CF_2O)_f$— wherein a, b, c, d, e and f are each 0 or a positive integer and satisfy the following equations:

$2 \leq a+b+c+d+e+f \leq 200$ and $1 \leq a+c+d+f$ and an iodine atom at at least one end of a molecule.

The sequence of the repeating units is homo or random.

The iodine-containing compound of the present invention is prepared by reacting a metal salt of a mono- or di-carboxylic acid comprising at least two repeating units selected from the formulae:

—$(CH_2CF_2CF_2O)_a$—

—$(CHClCF_2CF_2O)_b$—

—$(CCl_2CF_2CF_2O)_c$—

—$(CHFCF_2CF_2O)_d$—

—$(CFClCF_2CF_2O)_e$—

—$(CF_2CF_2CF_2O)_f$— wherein a, b, c, d, e and f are the same as defined above and iodine ($I_2$). Examples of the metal salt of such carboxylic acid are alkali metal salts (e.g. sodium salt, potassium salt, etc.) and copper group metal salts (e.g. copper salt, silver salt, etc.).

When the carboxylate salt is a salt of monocarboxylic acid, the iodine-containing compound of the present invention has an iodine atom at one end of the molecule, and when the carboxylic salt is a salt a dicarboxlic acid, the iodine-containing compound of the present invention has iodine atoms at both ends of the molecule. At the end of the molecule, the iodine atom bonds to the molecule generally in the form of —$CF_2CF_2I$, although it may be bonded to the molecule in other form such as —$OCF_2I$ and —$OCF_2CF_2CF_2I$.

The carboxylate salt to be used as a starting material can be prepared by converting the corresponding carboxylic acid comprising the above described repeating units into the salt by a conventional method. The carboxylic acid comprising the above described repeating units can be prepared by hydrolyzing an acyl fluoride compound comprising the above described repeating units and an acyl fluoride group at least at one end of the molecule which is disclosed in Japanese Patent Kokai Publication No. 113616/ 1986 and EP-A-No. 0148482.

When the iodine-containing compound of the present invention has one iodine atom at one molecular end, the other molecular end has an end group corresponding to a kind of an initiator which is used in the preparation of a polymer which comprises the above described repeating units. When 2,2,3,3-tetrafluorooxetane is ring opening polymerized, an acyl fluoride of the formula:

$$R_fCOF$$

wherein Rf is fluorine or a straight or branched fluoroalkyl group including a halogen-containing fluoroalkyl group such as $CF_2ClCFClCF_2$—is usually used as an initiator, although an initiator having a hydrocarbon chain such as $CH_3CF_2COF$ and $C_{12}H_{25}CF_2COF$ may be used. In addition to these monofunctional compound, a polyfunctional compound of the formula:

$$(COF)_2, CF_2(COF)_2 \text{ or } R_f'(COF)_2$$

wherein $R_f'$ is a fluorine-containing alkylene group which may have hydrogen and/or chlorine at a position other than $\alpha$ and $\alpha'$positions (cf. Japanese Patent Kokai Publication No. 137928/1985).

When the monofunctional acyl fluoride is used as an initiator, one end of the molecule has a residue derived from the initiator, which is $R_f$— in case of $R_fCOF$. When the polyfunctional acyl fluoride is used, both ends of the molecule are occupied by —CFO groups.

The reaction of the carboxylate salt and iodine is carried out usually at a temperature of from 150° to 250° C., preferably from 180° to 230° C.

The reaction is usually carried out in the presence of a solvent. Preferred examples of the solvent are 1,1,2-trichloro-1,2,2-trifluoroethane, tetrachlorodifluoroethane, $Cl(CF_2CFCl)_2Cl$ and $N(C_3F_7)_3$.

The reaction time varies with other reaction conditions such as reaction temperature, and is usually in a range from 1.5 to 15 hours.

The ratio of the carboxylate salt and iodine is not critical. Preferably, 0.001 to 0.1 mole of said salt is used per mole of iodine.

The reaction product is recovered from the reaction mixture by a per se conventional method, for example, by adding a solvent to the reaction mixture and filtering off insoluble materials followed by evaporation of the solvent.

The iodine-containing compound of the present invention can be used as a prepolymer for the production of various block copolymers which are useful as a grease or wax. This is because the carbon-iodine bonding at the molecular end is relatively weak, and olefinic repeating units can be easily added by cleaving said bonding in the presence of a radical-generating source and an olefin.

Thus, according to another aspect of the present invention, there is provided a block copolymer comprising at least two kinds of blocks in a molecule wherein at least one kind of the blocks (hereinafter referred to as "block A") is a homopolymeric or random copolymeric block comprising at least one block selected from the group consisting of:

(a) a block consisting of at least two repeating units selected from the formulae:

$$-(CH_2CF_2CF_2O)_a-$$
$$-(CHClCF_2CF_2O)_b-$$
$$-(CCl_2CF_2CF_2O)_c-$$
$$-(CHFCF_2CF_2O)_d-$$
$$-(CFClCF_2CF_2O)_e-$$
$$-(CF_2CF_2CF_2O)_f-$$

wherein a, b, c, d, e and f are the same as defined above, (b) a block consisting of the repeating units of the formula:

$$\overset{CF_3}{\underset{|}{-(CFCF_2O)_p-(CF_2CF_2O)_q-(CF_2O)_r-}}$$

wherein p, q and r are each 0 or a positive integer and satisfy the following equation:

$$2 \leq p+q+r \leq 200 \text{ and}$$

$$1 \leq p+q,$$

(c) a block consisting of the repeating units of the formula:

$$-(CF_2CF_2)_k-(CF_2CF)_m-\underset{|}{\overset{R_{f1}}{\underset{|}{(OCF_2CF)_n-OR_{f2}}}}$$

wherein $R_{f1}$ and $R_{f2}$ are the same or different and $C_1$-$C_3$ perfluoroalkyl, k and m are each a positive integer and satisfy the equations:

$$2 \leq k+m \leq 50 \text{ and}$$

$$0.2 \leq m/(k+m).$$

and n is an integer of 0 to 10, and (d) a block consisting of repeating units of the formula:

$$-(CF_2CFCl)_x-$$

wherein x is an integer of 2 to 11, and at least one kind of other blocks (hereinafter referred to as "block B") is a homopolymeric or random copolymeric block consisting of repeating units of the formula:

$$-(CF_2CXY)-$$

wherein X is hydrogen or fluorine, Y is hydrogen, chlorine, fluorine, difluoromethyl or $C_1$-$C_8$ perfluoroalkyl or perfluoroalkoxy provided that when the former block consists of the repeating unit (d) alone, the combination of X=fluorine and Y=chlorine is excluded, the content of the latter block being 1 to 95% by weight based on the whole weight of the block copolymer and a number average molecular weight of the whole block copolymer being from $1 \times 10^3$ to $1 \times 10^6$.

A typical block copolymer of the present invention has a block structure of A—B or A—B—A.

The block copolymer of the present invention may be prepared by polymerizing at least one fluorine-containing olefin of the formula:

$$CF_2=CXY$$

wherein X and Y are the same as defined above in the presence of an iodinated compound comprising the block A and an iodine atom at at least one end, and a radical-generating source.

Chain propagation of the fluorine-containing olefin is stopped by the elimination of iodine atom from the iodine-containing compound, namely a chain transfer reaction. However, since a bonding between the polymer end and the iodine atom formed by the chain transfer reaction at the chain end has substantially the same reactivity as the above described carbon-iodine bonding in the iodine-containing compound, the chain propagation reaction can be reinitiated in the presence of a radically polymerizable compound, when a radical is formed at the chain end by the radical-generating source. Therefore, the polymer chain end acts as if it were a living end in an ionic polymerization.

The block copolymer of the present invention has an iodine atom at at least one chain end. If desired, the iodine atom may be substituted with other atom or an atomic group to stabilize or activate the block copolymer. Examples of other atom or atomic group are hydrogen, fluorine, chlorine, bromine, $-CF_2H$, $-CF_2Z$, $-CH_2OH$, $-CH_2CH_2OH$, $-COZ$, $-COR$, $-COOH$, $-COOM$, $-COOR$, $'CF_2R$, $-CH_2NH_2$, $-CH_2CH_2NH_2$, $-CH_2NCO$, $-CH_2CH_2-NCO$, $-CN$, $-N_3$, $-CH_2OCOR$, $-SO_3H$, $-SO_3M$, $-PO(OH)_2$,

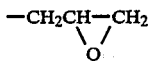

wherein Z is fluorine, chlorine or bromine, M is ammonium or monovalent metal, and R is alkyl or aryl.

The other end of block copolymer (other than the iodine atom) varies with the kind of the initiator as described in the above in connection with the iodine-containing compound of the present invention.

The iodinated compound to be used for the preparation of the block copolymer of the present invention (namely, the block A having an iodine atom at at least one end) may be prepared by iodinating a known compound comprising at least one of the blocks (a) to (d). The compound comprising the block (a) is disclosed in Japanese Patent Kokai Publication Nos. 137928/1985, 202122/1985 and 113616/1986 and EP-A-No. 0148482, the compound comprising the block (b) is disclosed in Japanese Patent Publication No. 45719/1974 and U.S. Pat. No. 3,250,807, the compound comprising the block (c) is disclosed in Japanese Patent Kokai Publication No. 189210/1983 and U.S. Pat. No. 4,499,249, and the compound comprising the block (d) is disclosed in "Telomerization", U.S. Naval Res. Lab. Rept. PB131910.

Examples of the fluorine-containing olefin are vinylidene fluoride, tetrafluoroethylene, trifluoroethylene, trifluorochloroethylene, hexafluoropropylene, pentafluoropropylene, perfluoromethyl vinyl ether, perfluoroethyl vinyl ether and perfluoropropyl vinyl ether.

A ratio of the iodinated compound and the fluorine-containing olefin depends on the ratio of the block A and the block B in the block copolymer.

Any conventional radical-generating source may be used according to the present invention. The preferred radical-generating sources are light and heat, which can selectively cleave the I-C bonding in the iodinated compound. As light, one having a wavelength of from infrared range to ultraviolet range can be used. Although actinic ultraviolet light may be used, it cleaves not only the I-C bonding but also other bondings to generate radicals. The same phenomenon is observed when ionizing radiation is used as the radical-generating source. When heat is used as the radical-generating source, preferably a temperature not lower than 200° C. is applied.

It is possible to use, as the radical-generating source, a conventional radical polymerization initiator which induces substantially no chain transfer reaction and is decomposed at a moderate rate under radical polymerization conditions. As the radical polymerization initiator, organic or inorganic peroxides, azo compounds, organometallic compounds, metals, etc.

Among them, the organometallic compounds are less preferred, since they generate radicals by eliminating not only the iodine atom but also other atoms or atomic groups. Preferred examples of the radical polymerization initiator are persulfates (e.g. potassium persulfate and amminium persulfate), hydrogen peroxide, $(R_fCO)_2O_2$, $R_fOOR_f$, $R_fC(O)OOR_f$, $(R_f)_3COOC(O)OC(R_f)_3$, $N_2F_2$, $R_f-N=N-R_f$, $Hg(R_f)_2$, Li, K, Na, Mg, Zn, Hg and Al wherein $R_f$ is polyfluoroalkyl. When the radical polymerization initiator is used, it is preferred to keep its concentration as low as possible so as to suppress a termination reaction caused by bonding of the radicals and to predominantly proceed the chain propagation.

A polymerization temperature may be any temperature insofar as the reaction is initiated and the produced polymer chain is not thermally decomposed. Preferably, it is from −20° C. to +150° C. when the radical-generating source other than heat is used. When heat is used, a temperature not lower than 200° C., preferably not lower than 250° C. is applied.

A polymerization pressure is not critical in the present invention. Preferably, it is from atmospheric pressure to autogenous pressure.

The radical polymerization may be carried out in any conventional manner such as bulk, solution, suspension and emulsion polymerization. All the steps of the polymerization can be carried out in the same manner, although the steps may be carried out in different manners from each other. In view of homogeneity of the reaction system, emulsion polymerization is most preferred. Other preferred polymerization methods are solution polymerization and suspension polymerization utilizing a solvent which is essentially inactive against radical. Examples of such solvent are perfluoro(dimethylcyclobutane), perfluorocyclohexane, dichlorotetrafluoroethane, trichlorotrifluoropropane, polyfluoroalkanes, perfluoro(ethylene glycol methyl ethyl ether), etc.

The novel block copolymer of the present invention has good lubrication and protective properties and finds many applications. Particularly, the block polymer can be used as a grease. Although it can be used as a thickening agent to be added to a base oil, it can be used as a grease as such. This is because the block copolymer of the present invention has the block having good lubricity like an oil (block A) and the block which acts as a thickening agent (block B).

Therefore, according to further aspect of the present invention, there is provided a grease which comprises a block copolymer comprising at least two kinds of blocks at least one of which consists of a homopolymeric or random copolymeric block which acts as a viscous liquid component and at least one of other of which consists of a homopolymeric or random copolymeric block bonded to the former block to make the block copolymer solid or semisolid.

In this specification, "a block which acts as a viscous liquid" is intended to mean that the a compound comprising said block is a liquid having a viscosity of 10 to 500 cSt at 37.8° C. "To make the block polymer solid or semi-solid" is intended to mean that said block makes the block copolymer to have a consistency of 85 to 475 according to ASTM D 271-60T.

According to a conventional definition of "grease" according to JIS, a grease is defined as a solid or semi-solid lubricating composition comprising a liquid lubricant (base oil) and a thickening agent. A grease composition comprising perfluoropolyether as a base oil and polytetrafluoroethylene powder as a thickening agent is known as a heat resistant grease composition. However, such conventional composition type grease inevitably has a drawback that the liquid lubricant (base oil) and the thickening agent separate from each other after long time use, since they are not completely compatible with each other.

When the block copolymer as defined above is used as a single component grease, the grease does not suffer from such drawback, so that it can be stably used for a long time. In such case, the content of block B is preferably from 10 to 30% by weight. When the content of block B is from 1 to 10% by weight, preferably the polymer terminal has —COOM group in which M is metal. The number average molecular weight is preferably from $1 \times 10^3$ to $3 \times 10^4$.

Further, such block copolymer has good compatibility with an organic solvent and forms a useful grease composition.

In addition to the novel block polymer comprising one of the blocks (a), (b), (c) and (d) according to the present invention, the homopolymer or random copolymer which acts as the viscous liquid component may be selected from a wide range of conventional synthetic lubricants. Examples of such lubricants are (1) synthetic hydrocarbon lubricants (e.g. an α-olefin oligomer of the formula:

—(CH$_2$CHR$_1$)$_n$— wherein R$_1$ is hydrogen, C$_m$H$_{2m+1}$ (in which m is an integer of 1 to 8) or C$_{m'}$H$_{2m'+1}$ (in which m' is 5, 6 or 7 and n is a positive integer, and alkylbenzene of the formula:

wherein R$_2$ and R$_3$ are each C$_4$–C$_{20}$ alkyl);

(2) polyethers (e.g. polyalkylene glycol of the formula:

R$_4$—O—(CH$_2$CHR—O)$_n$—R$_5$ wherein R$_4$, R$_5$ and R$_6$ are each hydrogen, methyl or ethyl and n is a number of 8 to 100, and polyphenyl ether of the formula:

wherein n is a number of 8 to 100);

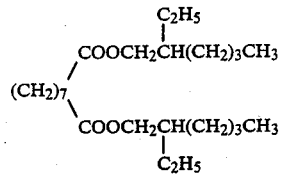

and neopentylpolyol ester of the formula:

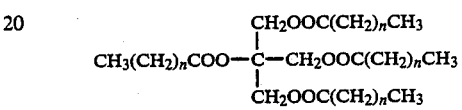

wherein n is a number of 4 to 20.

(4) silicone oils (e.g. alkylmethylsilicone of the formula:

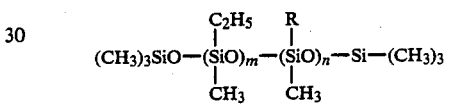

wherein R is hydrogen, methyl, ethyl or phenyl, and m and n are each a number of 4 to 100, and fluorosilicone of the formula:

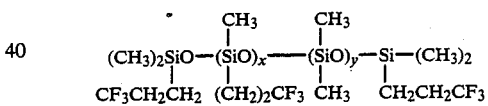

wherein x and y are each a number of 4 to 100.

As the homopolymeric or random copolymeric block bonded to the former block which acts as a viscous liquid component to make the block copolymer solid or semi-solid, exemplified are polyolefins (e.g. polyethylene and polypropylene), polystyrene, polyacrylate (e.g. polymethyl (meth)acrylate and polyethyl (meth)acrylate), fluororesin and the like.

Preferred combinations of the polymeric block which acts as a viscous liquid component and the polymer block bonded to the former block to make the block copolymer solid or semi-solid are (i) A fluorine-containing polymeric block and a fluororesin block, (ii) A non-fluorine containing polymer block and a fluororesin block, and (iii) A fluorine-containing polymer block and a non-fluorine containing resin block.

The combination (i) corresponds to the novel block copolymer according to the present invention.

Thus, the combinations (ii) and (iii) are now explained in detail.

(ii) A non-fluorine containing polymer block and a fluororesin block

A block copolymer having such structure may be prepared by radically adding a halogenated hydrocarbon of the formula:

$$CF_3(CF_2)_zI$$

wherein z is an integer of 5 to 100 to a hydrocarbon, an ester, a phosphate and a silicone which have a vinyl, vinylene or allyl group. The obtained block copolymer can be stabilized by removing the iodine atom at the molecular end by a catalytic hydrogenation in the presence of a metal hydride (e.g. LiAlH$_4$), a combination of zinc and hydrogen chloride or a catalyst such as Ni and Pd.

For example, in case of the silicone oil, the block copolymer can be prepared according to following reaction:

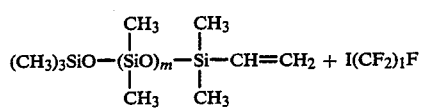

↓ a peroxide as a radical-generating source in a solvent such as Cl(CF$_2$CF$_2$)$_2$Cl

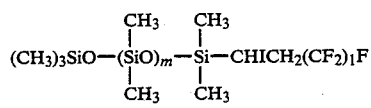

↓ Zn + HCl blowing

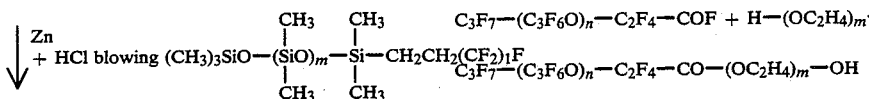

or

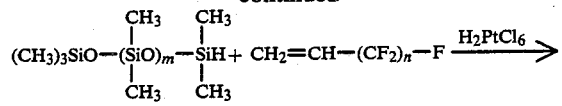

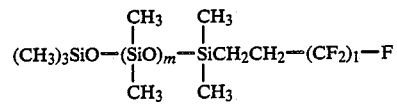

In case of the α-olefin oligomer, the block can be prepared according to the following reaction:

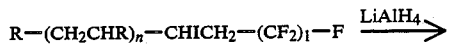

In case of the ester, from an ally ester, the block copolymer can be prepared according to the following reaction:

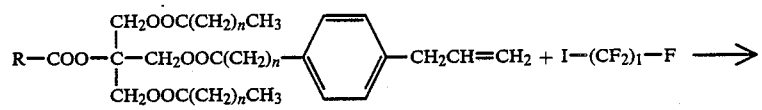

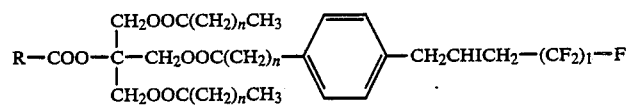

(iii) A fluorine-containing polymeric block and a non-fluorine containing resin block This kind of block copolymer can be prepared according to the following reaction:

$$C_3F_7-(C_3F_6O)_n-C_2F_4-COF + H-(OC_2H_4)_m-OH \longrightarrow$$
$$C_3F_7-(C_3F_6O)_n-C_2F_4-CO-(OC_2H_4)_m-OH$$

or

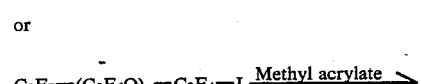

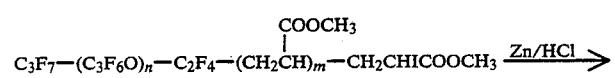

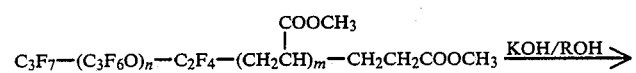

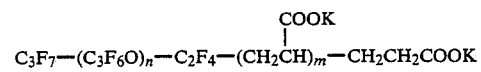

When styrene is used in place of methyl acrylate in the above reaction,

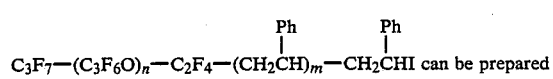

Such the block copolymer is useful not only as the grease but also as an additive for an automobile engine oil.

It is known that combustion efficiency in the engine is increased by improving lubricity between a cylinder and a piston of the engine by the addition of a solid lubricant comprising polytetrafluoroethylene powder. However, isolation of polytetrafluoroethylene powder is problem. The above described block copolymer can provide a lubricant to be used in the engine oil.

Therefore, according to a yet further aspect of the present invention, there is provided a lubricant composition comprising 0.5 to 60% by weight of the above described block copolymer and the rest of an organic liquid.

Such composition is also useful as a lubricant for a surface of a magnetic recording medium such as a recording tape, a video tape, a magnetic disc, a magnetic card, etc.

The organic liquid can be selected from a wide variety of organic liquids. Specific examples of the organic liquid are trichlorotrifluoroethane, tetrachlorodifluoroethane, dichlorotetrafluoroethane, perfluorohexane, perfluorotributylamine, acetone, tetrahydrofuran, dimethylformamide and diglyme.

By selecting the ratio of the block A and the block B, the block copolymer in the form of from grease to wax can be prepared.

The above described block copolymer may be used as a thickening agent for a conventional grease or as a mold release agent, or in the preparation of an ink composition. Further, some block copolymers can be used as a water- and oil-repellent, a leveling agent, a toner aid (an off-set preventing agent) and the like.

The present invention will be illustrated by following Examples.

EXAMPLE 1

To $F(CF_2CF_2CF_2O)_nCF_2CF_2COOH$ (n =26 on the average) (200 g, 4.46 ×$10^{-2}$ mole) in trichlorotrifluoroethane (100 ml), 80 ml of an aqueous solution of potassium hydroxide (containing 4.87 g of KOH) was added with stirring to form a potassium salt. It was confirmed that, in the IR spectrum, a peak for $-C(=O)-OH$ at 1,770 $cm^{-1}$ completely shifted to a peak for $-C(=O)-OK$ at 1,680 $cm^{-1}$.

The obtained potassium salt was dried at 100° C. under reduced pressure to form particles. Then, the particulate potassium salt (200 g, 0.044 mole) was dispersed in trichlorotrifluoroethane (600 ml) in a nitrogen stream followed by the addition of iodine (100 g, 0.39 mole). The mixture was heated at 200° C. for 1.5 hours to iodinate the molecular end. While the unreacted potassium salt was in the particle form, the resulting product was a white opaque oil. In the IR spectrum, the peak for $-C(=O)-OK$ at 1,680 $cm^{-1}$ disappeared and a peak for $-CF_2CF_2I$ appeared at 910 $cm^{-1}$. $^{19}F$—NMR spectrum of the resulting oil had a chemical shift at $-12.5$ ppm, which indicated the formation of $-OCF_2CF_2I$.

When the white opaque oil was dissolved in trichlorotrifluoroethane and kept standing at $-20°$ C., the white material was precipitated to form a transparent supernatant. The precipitate was filtered off. From the filtrate, trichlorotrifluoroethane was evaporated off to give transparent $F(CF_2CF_2CF_2O)_nCF_2CF_2I$ (n =26 on the average) (176 g).

EXAMPLE 2

To $F(CF_2CF_2CF_2O)_nCF_2CF_2COOH$ (n=26 on the average (87 g, 4.46×$10^{-2}$ mole), silver oxide (249 g, 1.07×$10^{-2}$ mole) and trichlorotrifluoroethane (120 ml) were added and reacted with stirring for 3 hours. It was confirmed that, in the IR spectrum, a peak for $-C(=O)-OH$ at 1,770 $cm^{-1}$ shifted to a peak for $-C(=O)-OAg$ at 1,680 $cm^{-1}$.

The obtained silver salt was dried at 50° C. under reduced pressure to form particles. Then, the particulate silver salt (101.0 g) was dispersed in trichlorotrifluoroethane (300 ml) followed by the addition of iodine (100 g, 0.39 mole). The mixture was heated at 170° C for 2 hours to iodinate the molecular end. Undissolved materials were filtered off. From the filtrate, trichlorotrifluoroethane was evaporated off to give $F(CF_2CF_2CF_2O)_nCF_2CF_2I$ (n=26 on the average) (90.1 g). In the IR spectrum, the peak for $-C(=O)-OAg$ at 1,680 $cm^{-1}$ disappeared and a peak for $-CF_2CF_2$ I appeared at 910 $cm^{-1}$ $^{19}F$—NMR spectrum of the resulting compound had a chemical shift at $-12.4$ ppm, which indicated the formation of $-OCF_2CF_2I$.

EXAMPLE 3

To $F(CF_2CF_2CF_2O)_nCF_2CF_2COOH$ (n=26 on the average) (260 g, 6.05×$10^{-2}$ mole) in methanol (1260 ml), sodium methoxide (4.90 g, 9.08×$10^{-2}$ mole) was added with stirring to form a sodium salt. It was confirmed that, in the IR spectrum, a peak for $-C(=O)-OH$ at 1,770 $cm^-$ completely shifted to a peak for $-C(=O)-ONa$ at 1,680 $cm^{-1}$.

The obtained sodium salt was dried at 100° C. under reduced pressure to form particles. Then, the particulate sodium salt (261 g) was dispersed in $Cl(CF_2CFCl)_{n'}Cl$ (n'=2 on the average) (250 ml) followed by the addition of iodine (261 g, 0.03 mole). The mixture was heated at 240° C. for 5.2 hours to iodinate the molecular end. After adding trichlorotrifluoroethane to the reaction mixture, undissolved materials were filtered off. From the filtrate, trichlorotrifluoroethane was evaporated off to give $F(CF_2CF_2CF_2O)_n-CF_2CF_2I$ (n=26 on the average) (54.0 g). In the IR spectrum, the peak for $-C(=O)-ONa$ at 1,680 $cm^{-1}$ disappeared and a peak for $-CF_2CF_2I$ appeared at 910 $cm^{-1}$.

EXAMPLE 4

To $F(CF_2CF_2CF_2O)_nCF_2CF_2COOH$ (n=26 on the average) (50 g, 1.12×$10^{-2}$ mole), cuprous oxide (6.0 g, 4.19×$10^{-2}$ mole) was added with stirring in the presence of trichlorotrifluoroethane (50 ml) to form a copper salt. It was confirmed that, in the IR spectrum, a peak for $-C(=O)-OH$ at 1,770 $cm^{-1}$ completely shifted to a peak for $-C(=O)-OCu$ at 1,680 $cm^{-1}$.

The obtained copper salt was dried at 100° C. under reduced pressure to form particles. Then, the particulate copper salt (10.8 g) was dispersed in trichlorotrifluoroethane (50 ml) followed by the addition of iodine (10.2 g, 4.02 mole). The mixture was gradually heated to 210° C. and kept at the same temperature for 2.0 hours to iodinate the molecular end. After adding trichlorotrifluoroethane to the reaction mixture, undissolved materials were filtered off. From the filtrate, trichlorotrifluoroethane was evaporated off to give $F(CF_2CF_2CF_2O)_nCF_2CF_2I$ (n=26 on the average) (5.4 g). In the IR spectrum, the peak for $-C(=O)-OCu$ at $1,680 \text{ cm}^{-1}$ disappeared and a peak for $-CF_2CF_2I$ appeared at $910 \text{ cm}^-$.

REFERENCE EXAMPLE

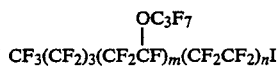

In a one liter autoclave, $CF_3(CF_2)_3I$ (276.8 g, 0.80 mole), di(3,5,6-trichloroperfluorohexyl peroxide) (45.3 g, $6.52\times10^{-2}$ mole) and $CF_2=CF(OC_3F_7)$ (300 g, 1.13 mole) were charged. Then, the autoclave was pressurized by tetrafluoroethylene to proceed polymerization at 20° C. under pressure of from 0.5 to 0.3 kg/cm² for 41.5 hours to obtain

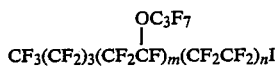

m/n=32/68, number average molecular weight =840) (175 g) as an oily product.

EXAMPLE 5

In a one liter autoclave, $F(CF_2CF_2CF_2O)_nCF_2CF_2I$ (n=26 on the average) prepared in Example 1 (140 g, $3.07\times10^{-2}$ mole), trichlorotrifluoroethane (600 ml) and di-tert.-butyl peroxide ($8.25\times10^{-2}$ g, $5.65\times10^{-4}$ mole) were charged. After purging the interior space with tetrafluoroethylene, the autoclave content was heated to 120° C. Then, the autoclave was pressurized with tetrafluoroethylene with stirring and polymerization was continued at 120° C. under pressure of from 6.1 to 6.4 kg/cm² for 27.6 hours. The solution in the autoclave which was transparent before polymerization was converted to a white opaque mixture after polymerization. Complete evaporation of trichlorotrifluoroethane from the reaction mixture gave a greasy polymeric product having a number average molecular weight of 5,240 (161 g). The content of the polytetrafluoroethylene block was 13% by weight.

EXAMPLE 6

In the same autoclave as used in Example 5, $F(CF_2CF_2CF_2O)_nCF_2CF_2I$ (n=26 on the average) prepared in Example 1 (200 g, $4.89\times10^{-2}$ mole), trichlorotrifluoroethane (500 ml) and di-tert.-butyl peroxide (0.19 g, $1.32\times10^{-3}$ mole) were charged. After purging the interior space with tetrafluoroethylene, the autoclave content was heated to 120° C. Then, the autoclave was pressurized with tetrafluoroethylene with stirring and polymerization was continued at 120° C. under pressure of from 6.6 to 7.1 kg/cm² for 54.4 hours. Evaporation of trichlorotrifluoroethane from the reaction mixture gave a greasy (almost waxy) polymeric product having a number average molecular weight of 6,200 (303 g). The content of the polytetrafluoroethylene block was 34% by weight.

EXAMPLE 7

In a 100 ml autoclave, $F(CF_2CF_2CF_2O)_nCF_2CF_2I$ (n=26 on the average) prepared in Example 1 (7.69 g, $1.69\times10^{-3}$ mole), trichlorotrifluoroethane (30 ml) and tert.-butylperoxy isobutyrate ($2.20\times10^{-2}$ g, $1.51\times10^{-4}$ mole) were charged. After purging the interior space with a gaseous mixture of vinylidene fluoride and trifluoroethylene (molar ratio of 75/25), the autoclave content was heated to 80° C. Then, the autoclave was pressurized with the same gaseous mixture of vinylidene fluoride and tetrafluoroethylene with stirring and polymerization was continued at 80° C. under pressure of from 3 to 5 kg/cm² for 12.56 hours to give a waxy polymeric product having a number average molecular weight of 5,520 (9.33 g). The content of the vinylidene fluoride/tetrafluoroethylene copolymer block was 18% by weight. The produced block copolymer is soluble in tetrahydrofuran as well as trichlorotrifluoroethane.

EXAMPLE 8

In a one liter autoclave,

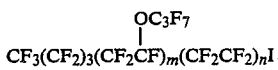

(m/n=32/68 prepared in Reference Example (97 g, 0.12 mole), trichlorotrifluoroethane (410 ml) and di(3,5,6-trichloroperfluorohexyl peroxide) (0.14 g, $1.94\times10^{-4}$ mole) were charged. Then, the autoclave was pressurized with tetrafluoroethylene with stirring and polymerization was continued at 20° C. under pressure of from 2.0 to 1.5 kg/cm² for 4.3 hours. Evaporation of trichlorotrifluoroethane from the reaction mixture gave a greasy polymeric product having a number average molecular weight of 980 (118 g). The content of the polytetrafluoroethylene block was 18% by weight.

EXAMPLE 9

The greasy block copolymer prepared in Example 5 (50 g) was dispersed in trichlorotrifluoroethane (225 ml) and heated to 50° C. To the heated dispersion, a gaseous mixture of fluorine and nitrogen containing 10% by weight of fluorine was bubbled at a rate of from 20 to 30 ml/min. for 8.6 hours to fluorinate the block copolymer. In the IR spectrum of the fluorinated copolymer, a peak for $-CF_2CF_2I$ at $910 \text{ cm}^{-1}$ completely disappeared. The product was not colored by the addition of ethanol, which indicated no liberation of iodine. Therefore, the complete substitution of the terminal iodine with fluorine was confirmed.

EXAMPLE 10

The block copolymer prepared in Example 9 (hereinafter referred to as "Blocked grease") was examined on the following properties. For comparison, a grease comprising $F(CF_2CF_2CF_2O)_nCF_2CF_3$ (n=28 on the average) as a base oil and polytetrafluoroethylene powder as a thickening agent in a weight ratio of 67:33 (hereinafter referred to as "Non-blocked grease") was used.

APPEARANCE

By visual inspection, the blocked grease was transparent, while the non-blocked grease was white. This may be because the blocked grease had such structure that the base oil element and the thickening agent element were chemically bonded in the molecule and their compatibility was increased, whereby the grease was transparent.

The particle size in the grease was inspected by a polarization microscope (×200). In the non-blocked grease, polytetrafluoroethylene particles having a diameter of from $1\times10^{-5}$ to $5\times10^{-5}$ m were observed, while in the blocked grease, no particle was observed.

From the above results, it can be concluded that the particles of the blocked grease according to the present invention is smaller and more homogeneous than those of the non-blocked grease.

SETTLING OF PARTICLES

The blocked or non-blocked grease was added to trichlorotrifluoroethane to prepare a dispersion with a concentration of 10% by weight and kept standing to observe the settling state.

While in case of the non-blocked grease, the particles settled immediately, while in case of the blocked grease, the dispersion was stable at least two days.

From these results, it can be said that the blocked grease is less separated from an organic solvent than the non-blocked grease.

LUBRICITY

By using a cone-plate type viscometer, viscosity was measured and expressed in the form of a shear stress-shear rate curve. The results for the blocked grease and the non-blocked grease are shown in FIGS. 1 and 2, respectively.

The viscosity measurement was carried out as follows:

At a temperature of 30° C. or 80° C., the shear rate was increased to 307.2 sec.$^{-1}$ for the blocked grease or 3072 sec$^{-1}$ for the non-blocked grease over 3 minutes and kept at said rate for 0.2 minute. Then, the shear rate was decreased to 0 (zero) over 3 minutes.

Figure 2:
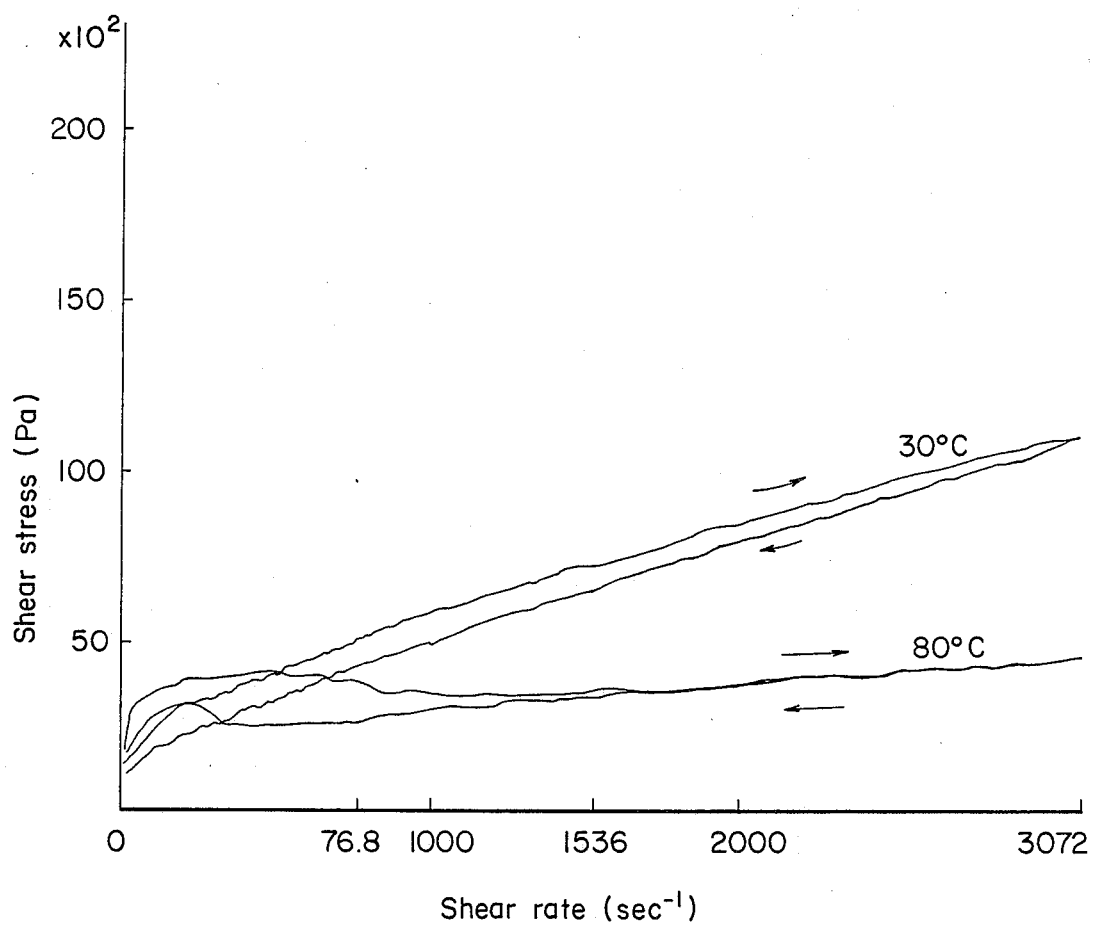

In FIGS. 1 and 2, in both cases of the blocked and non-blocked grease, the shear stress during increasing the shear rate is smaller than that during decreasing the shear rate at 30° C. and 80° C. This showed that both greases had thixotropy.

In case of the non-blocked grease, the shear stress increased substantially linearly as the shear rate was increased, while in case of the blocked grease, as the shear rate was increased, the shear stress reached the maximum value and thereafter gradually decreased with the increase of the shear rate. In addition, a rather clear yield value was observed in the blocked grease, but no clear yield value was observed in the non-blocked grease.

In view of the properties of a grease, it is preferred that the grease does not flow under a small shear stress, namely it has a yield value, but once it begins to flow, it easily flows. Thus, the blocked grease of the present invention has better properties than the non-blocked grease.

EXAMPLE 11

In the same manner as in Example 9, the blocked polymer prepared in Example 6 was fluorinated. To the fluorinated block polymer (70.0 g), $F(CF_2CF_2CF_2O)_nCF_2CF_3$ (n=28 on the average) (49.8 g) was added as a lubricant oil to prepare a grease composition.

The obtained grease composition was a semi-solid material with good transparency. It had no dropping point not higher than 200° C. A degree of oil separation measured at 200° C. for 200 hours was 0 (zero).

EXAMPLE 12

To $Cl(CF_2CF_2)_2Cl$ (20 ml), $C_3F_7O$—$(CF_2CF_2CF_2O)_{24}$—$CF_2CF_2$—I (10 g) and azobisisobutyronitrile (0.05 g) were dissolved and charged in a 50 ml airtight reactor. Then, methyl acrylate (10 g) was added and reacted at 70° C. with stirring in the absence of air. In less than 10 minutes, the reactor content became white opaque, which indicated initiation of polymerization. After 3 hours, the temperature was raised to 80° C. and the reaction mixture was stirred for another 3 hours to complete the polymerization. While the starting material $C_3F_7O$—$(CF_2CF_2CF_2O)_{24}$—$CF_2CF_2$-I was soluble in $Cl(CF_2CF_2)_2Cl$, the opaque viscous greasy product contained a large amount of materials insoluble in $Cl(CF_2CF_2)_2Cl$. Further, the product is soluble in acetone, in which $C_3F_7$—$(CF_2CF_2CF_2O)_{24}$—$CF_2CF_2$—I is insoluble. According to GPC analysis of the product, the formation of a block polymer was confirmed.

A filter paper dipped in the product and dried had water- and oil-repellency.

What is claimed is:

1. An iodine-containing compound consisting of at least two repeating units selected from the formulae:

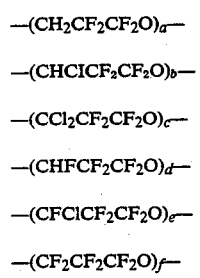

wherein a, b, c, d, e and f are each 0 or a positive integer and satisfy the following equations:

$$2 \leq a+b+c+d+e+f \leq 200 \text{ and}$$

$$1 \leq a+c+d+f$$

and an iodine atom at at least one end of a molecule.

2. The iodine-containing compound according to claim 1, which has an iodine atom at one end of a molecule.

3. The iodine-containing compound according to claim 1, which as an iodine atom at each of the molecular ends.

4. A process for preparing an iodine-containing compound consisting of at least two repeating units selected from the formulae:

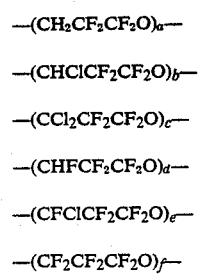

wherein a, b, c, d, e and f are each) or a positive integer and satisfy the following equations:

$$2 \leq a+b+c+d+e+f \leq 200 \text{ and}$$

$$1 \leq a+c+d+f$$

and an iodine atom at at least one end of a molecule, which comprises reacting a metal salt of a mono- or di-carboxylic acid comprising at least two repeating units selected from the formulae:

—(CH$_2$CF$_2$CF$_2$O)$_a$—

—(CHClCF$_2$CF$_2$O)$_b$—

—(CCl$_2$CF$_2$CF$_2$O)$_c$—

—(CHFCF$_2$CF$_2$O)$_d$—

—(CFClCF$_2$CF$_2$O)$_e$—

—(CF$_2$CF$_2$CF$_2$O)$_f$— wherein a, b, c, d, e and f are the same as defined above and iodine at a temperature of from 150° to 250° C.

5. The process according to claim 4, wherein the metal salt is an alkali metal salt.

6. The process according to claim 4, wherein the metal salt is a copper group metal salt.

* * * * *